UNITED STATES PATENT OFFICE.

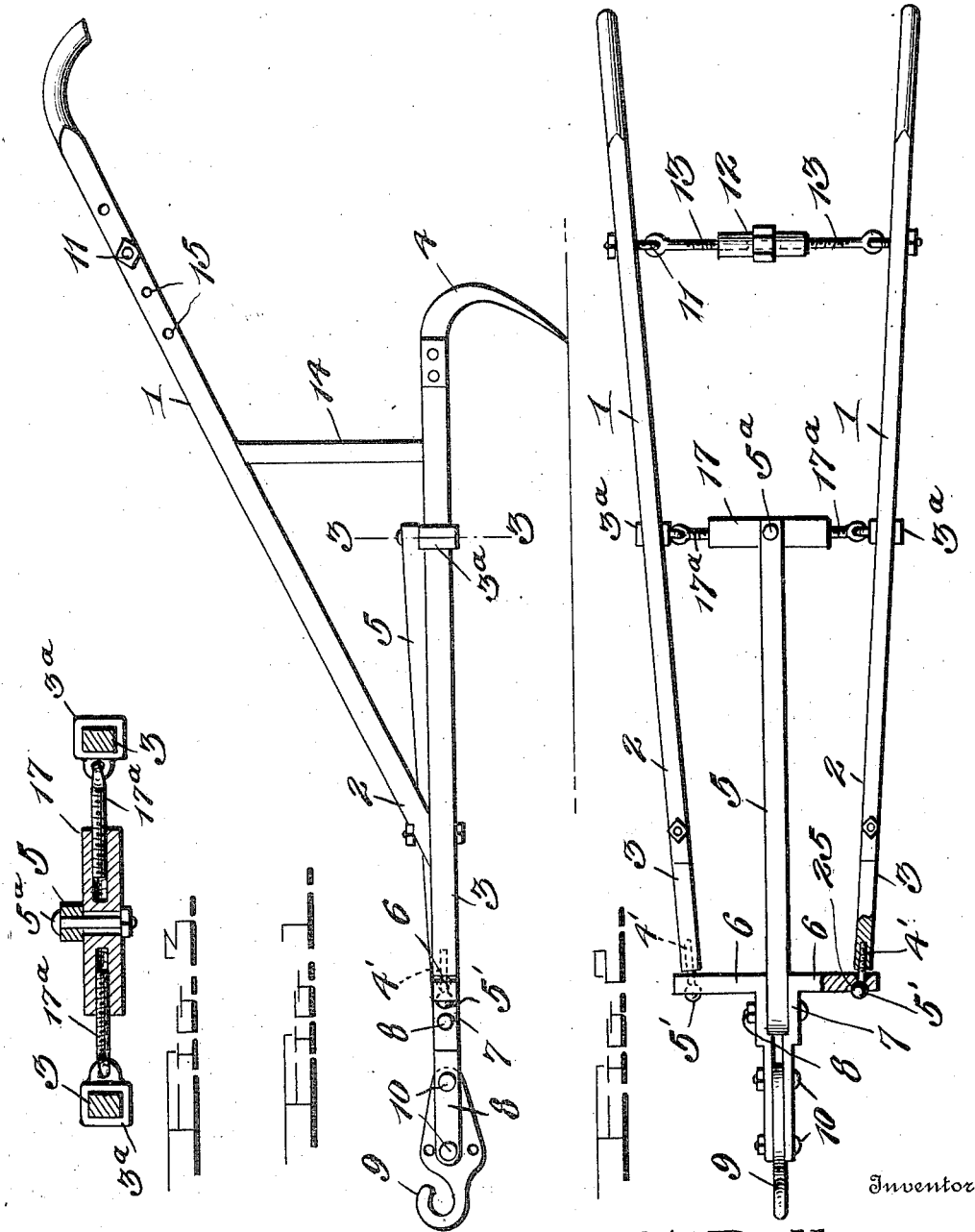

WILLIAM ALFRED PRILLIMAN, OF HENRY, VIRGINIA.

PLOW.

1,036,903.

Specification of Letters Patent.  Patented Aug. 27, 1912.

Application filed August 26, 1911. Serial No. 646,174.

*To all whom it may concern:*

Be it known that I, WILLIAM ALFRED PRILLIMAN, a citizen of the United States, residing at Henry, in the county of Franklin and State of Virginia, have invented certain new and useful Improvements in Plows, of which the following is a specification, reference being had to the accompanying drawings.

This invention relates to plows and more particularly to a device having a plurality of plow points attached thereto.

The object of this invention is to arrange in a plow having a plurality of plow points, means whereby the latter can automatically adjust themselves independently of one another to the contour of the land over which they are transmitted.

Another object of this invention is to provide means for separating the plow points from one another and arranging such means so that they can be readily applied to a plow.

A further object of this invention is to have the means referred to as simple as possible so that they can be readily and cheaply manufactured and applied to a plow or the like.

A still further object is to have the portion of the device where the various parts of the framework join arranged so as to provide an arrangement whereby the various devices can be easily put together or separated as desired, at the same time providing a joint which will be particularly capable of withstanding the strains which such an apparatus has to undergo.

Other objects of this invention will become apparent as it is more fully set forth.

In the accompanying drawings, which illustrate by way of example an embodiment of this invention, Figure 1 represents a view in elevation of a plow embodying this invention. Fig. 2 is a plan view of Fig. 1; and Fig. 3 is a detail sectional view along the line 3—3 of Fig. 1.

Similar reference characters refer to similar parts throughout the drawings.

In the construction shown in the drawings, 1 represents the handles of a plow which have their lower end portions 2 secured to the members 3 that are arranged to hold a plow point or the like 4, and which have their front portions 4' loosely connected to a central draw-bar 5 by means of a bolt 5', but separated therefrom by the spacing block 6. Secured to the block 6, are angular pieces 7 which hold within their outwardly extending portions 8 the central tree 5 and a draft hook 9, by means of bolts 10, as shown in the drawings. The upper and outer portions of the handles are provided with a joining or adjusting member, which principally consists of a pair of ring bolts 11 securely attached thereto, which has its outer portions provided with links 13, so that the handles can move up and down independently of one another. The bolts 5' have spherical heads which are adapted to engage and have free movement in semi-spherical recesses provided in the blocks 6, as is clearly shown in the sectional parts of Fig. 2. This arrangement of bolts and recesses enables the plow to easily and quickly adjust itself to the conditions arising, without producing any serious stresses in the parts actuated. A pair of uprights 14 secure and brace the handles and members in rigid alinement with one another, so that by spacing the handles by means of the adjusting means, just described, it is possible to adjust and separate the members 3 as desired. The draw-bar 5 is fastened to the cross piece 17, that is suitably secured to the members 3, by means of a turn buckle arrangement as is clearly shown in Fig. 3. The bolt that is used for securing the draw-bar 5 to the cross piece 17 is disposed within the hole in the latter, large enough to permit a sufficient amount of lateral movement of the bolt and cross bars, to enable the members 3 to adjust themselves to the various contours of the ground over which the device is drawn. The turn buckle arrangement, just referred to, is designed so as not to interfere in any way with the proper action of the turn buckle parts 12 and 13.

The action of the member for adjusting the spacing of the handles and the lower members 3 to support the plow points is so apparent as to need no further explanation. It can also be seen that the peculiar shape of the coupling 8 is such as to permit the ready joining of the various parts without interfering with their proper action.

The lower members or beams 3 are provided with a member 17 which is similar to that used between the handles 1, and which is secured to the central tree 5, as shown in the drawings, so that the latter will act directly thereon and remove some of the strain placed on the bolt 5' when the plow is drawn over a field. At the same time this member is arranged to permit the beams 3 to move up and down to conform with the contour of the ground over which they travel and thereby dig uniformly therein and keep the strain on the pulling or drawing means as uniform as possible.

It will be noted as best illustrated in Fig. 3, that the internally and oppositely threaded ends of the coupling member or transversely extending block 17 are engaged by oppositely threaded rods 17$^a$ which are secured at their outer ends to cuffs 3$^a$ that are mounted on the beams 3, whereby when the bolt 5$^a$ which connects the rear end of the draw bar 5 with the block 17 is taken out to disengage the draw bar from the block, the block 17 may be turned in one direction or the other to spread apart or draw together the beams.

Having thus described the invention what is claimed is:

A device of the character described including L-shaped draft members, a draw bar secured at its front end between said draft members, beams having a laterally swinging connection at their forward ends with the draft members on opposite sides of the draw bar, laterally adjustable handles carried by said beams, a transversely extending block interposed between said beams and bolted intermediate of its ends to the rear end of the draw bar, the ends of said block being internally and oppositely threaded, cuffs mounted on the respective beams and rods connected to said cuffs and extending inwardly toward each other and provided with oppositely disposed threads designed to engage the interior threads of the block whereby, upon detaching the rear end of the draw bar from the block the latter may be turned in one direction or the other to spread apart or draw together the beams.

In testimony whereof I hereunto affix my signature in the presence of two witnesses.

WILLIAM ALFRED PRILLIMAN.

Witnesses:
W. D. MARTIN,
J. F. HARRIS.

---

Copies of this patent may be obtained for five cents each, by addressing the "Commissioner of Patents, Washington, D. C."